US009520920B2

(12) United States Patent
Ng et al.

(10) Patent No.: US 9,520,920 B2
(45) Date of Patent: Dec. 13, 2016

(54) TRANSMITTING AND RECEIVING DIGITAL AND ANALOG SIGNALS ACROSS AN ISOLATOR USING AMPLITUDE MODULATION

(71) Applicant: Avago Technologies General IP (Singapore) Pte. Ltd., Singapore (SG)

(72) Inventors: Gek Yong Ng, Singapore (SG); Peng Siang Seet, Singapore (SG); Qian Tao, Singapore (SG); Kwee Chong Chang, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/524,908

(22) Filed: Oct. 27, 2014

(65) Prior Publication Data

US 2016/0119029 A1    Apr. 28, 2016

(51) Int. Cl.
*H04B 5/00* (2006.01)
(52) U.S. Cl.
CPC ..................... *H04B 5/005* (2013.01)
(58) Field of Classification Search
USPC .................................................. 332/109, 151
See application file for complete search history.

(56) References Cited

U.S. PATENT DOCUMENTS

| 4,841,571 A * | 6/1989 | Kage ................. H04K 1/00 332/119 |
| 5,237,310 A | 8/1993 | Smith |
| 6,181,086 B1 | 1/2001 | Katyl et al. |
| 6,225,927 B1 | 5/2001 | Scott |
| 6,388,396 B1 | 5/2002 | Katyl et al. |
| 6,389,063 B1 | 5/2002 | Kanekawa et al. |
| 6,570,343 B1 | 5/2003 | Shoji et al. |
| 6,611,553 B1 | 8/2003 | Scott et al. |
| 7,009,534 B2 | 3/2006 | Nachamiev et al. |
| 7,020,189 B2 | 3/2006 | Sweitzer et al. |

(Continued)

FOREIGN PATENT DOCUMENTS

| EP | 1715586 | 10/2006 |
| KR | 100987727 | 10/2010 |

OTHER PUBLICATIONS

"A Simple Alternative to Analog Isolation Amplifiers," Silicon Labs, 2013, 10 pages.

(Continued)

*Primary Examiner* — Joseph Chang (57) ABSTRACT

Various embodiments of systems for transmitting and receiving a plurality of signals across an isolation material are disclosed. In one embodiment, a first signal may be modulated into a first modulated signal. The first modulated signal is then modulated into a second modulated signal in accordance to a second signal using amplitude modulation. In another embodiment, a first signal and a second signal are modulated into a modulated signal before being modulated further using amplitude modulation. The detection of the modulated signal may be performed using a frequency detector and an amplitude detection circuit that are arranged in parallel. At least some of the apparatuses, circuits, systems and methods disclosed herein may be implemented using conventional CMOS design and manufacturing techniques to provide, for example, at least one or more integrated circuits.

20 Claims, 11 Drawing Sheets

(56) References Cited

U.S. PATENT DOCUMENTS

| | | | |
|---|---|---|---|
| 7,439,764 | B2 | 10/2008 | Twigg et al. |
| 7,525,365 | B1 | 4/2009 | Henry |
| 7,571,063 | B2 | 8/2009 | Howell et al. |
| 7,701,731 | B2 | 4/2010 | Dhuyvetter et al. |
| 7,738,568 | B2 | 6/2010 | Alfano et al. |
| 7,864,546 | B2 | 1/2011 | Dhuyvetter et al. |
| 7,920,010 | B2 | 4/2011 | Chen |
| 8,289,011 | B2 | 10/2012 | Vigelius |
| 8,462,003 | B2 | 6/2013 | Ng et al. |
| 8,552,695 | B2 | 10/2013 | Stracquadaini |
| 8,847,503 | B2 | 9/2014 | Chang et al. |
| 2003/0127997 | A1 | 7/2003 | Shoji et al. |
| 2008/0279288 | A1 | 11/2008 | Crawley et al. |
| 2011/0019446 | A1 | 1/2011 | Wu et al. |
| 2011/0127845 | A1* | 6/2011 | Walley .................. H02J 5/005 307/104 |
| 2012/0242378 | A1 | 9/2012 | Taghivand et al. |
| 2013/0163688 | A1 | 6/2013 | Calvin |
| 2013/0257527 | A1 | 10/2013 | Dong |

OTHER PUBLICATIONS

"Isolation Technologies for Reliable Industrial Measurements", National Instruments, Sep. 26, 2013, 2013, 1-7.

"Power: Telecom DC/DC Module: Analog Solution", TI.com Block Diagram (SBD), Texas Instruments. Http://www.ti.com/solution/power_telecom_dc_dc_module_analog. pp. 7/9-8/9. 2011.

"Quad-Channel, 2.5 Kv Isolators With Integrated DC-to-DC Converter", Amtel Corporation, 2005, 2005.

Watchdog IC ATA6025, Atmel Corporation, 2005, 2005.

"40 ns Propagation Delay, CMOS Optocoupler", Avago Technologies, Jun. 10, 2000.

"HCNR200 and HCNR201 High-Linearity Optocouplers", Avago Technologies, Nov. 18, 2008.

Chen, et al., "High Speed Digital Isolators Using Microscale On-Chip Transformers", Elektronik Magazine, Jul. 22, 2003, 1-6.

Coffey, "Analog Transmission Across Digital Barriers", 2006, Bodo's Power, Devices and Components, September, Signal Isolators. Downloaded from website <www.powerguru.org>, 2006, 6 pages.

Hatzidakis, et al., "Multichannel Data Transmission Through a Fiber Optic Cable", URL://hdl.handle.net/10945/22375, 1987, 1987, 1-105.

Ho, et al., "Ramp Signal Generation in Voltage Mode CCM Random Switching Frequency Buck Converter for Conductive EMI Reduction", IEEE, 2010, pp. 1-4, 2010.

* cited by examiner

- 520 GENERATING A PERIODIC WAVEFORM HAVING A FREQUENCY INDICATIVE OF THE DIGITAL SIGNAL

- 522 MODULATING THE PERIODIC WAVEFORM WITH A SECOND ANALOG SIGNAL TO GENERATE THE FIRST MODULATED SIGNAL SUCH THAT THE FIRST MODULATED SIGNAL HAS A PULSE WIDTH INDICATIVE OF THE SECOND ANALOG SIGNAL, AND THE SECOND MODULATED SIGNAL HAS A PULSE AMPLITUDE INDICATIVE OF THE FIRST ANALOG SIGNAL

- 524 COMPUTING THE SECOND ANALOG SIGNAL FROM THE RECEIVED ELECTRICAL SIGNAL

FIG. 5B

- 530 TRANSMITTING THE SECOND MODULATED SIGNAL IN A NORMAL MODE, AND TRANSMITTING THE SECOND MODULATED SIGNAL IN A FAULT MODE

- 532 DISREGARDING THE FIRST PARALLEL BRANCH IN THE FAULT MODE

- 534 DISREGARDING THE SECOND PARALLEL BRANCH IN THE NORMAL MODE

- 536 PASSING THE RECEIVED ELECTRICAL SIGNAL THROUGH A HIGH PASS FILTER

TRANSMITTING AND RECEIVING DIGITAL AND ANALOG SIGNALS ACROSS AN ISOLATOR USING AMPLITUDE MODULATION

FIELD OF THE INVENTION

Various embodiments of the inventions described herein relate to the field of isolators, such as galvanic isolators, and components, devices, systems and methods associated therewith.

BACKGROUND

An isolation device provides a means for moving a signal from one electrical circuit to another electrical circuit when the two electrical circuits are otherwise electrically isolated from one another. Usually the two electrical circuits operate at different voltages, and thus, must be electrically isolated. For example, consider an application in which a 5V battery-powered controller board is utilized to control a motor circuit operating at 240V. In this example, it is essential to electrically isolate the 240V motor circuits from the 5V controller circuit, while permitting the 5V controller circuit to send or receive signals from the 240V motor circuit. In this type of application, an isolation device may be used to provide voltage and noise isolation, while permitting the information exchange between the two circuit systems. For electrical system with more than two circuits operating at different voltages, a multichannel isolation device may be used.

In an isolated system where two or more signals are transmitted across an isolation barrier, an equivalent number of isolation devices are typically required to transmit the signals across the isolation barrier. The requirement for equivalent number of isolation devices adds to cost. Furthermore, in some cases it may not be feasible to employ two isolation devices in an integrated circuit package due to space constraints. What is need is an isolated communication system where analog and digital signals can be transmitted and received through a single isolation channel.

BRIEF DESCRIPTIONS OF THE DRAWINGS

Illustrative embodiments by way of examples, not by way of limitation, are illustrated in the drawings. Throughout the description and drawings, similar reference numbers may be used to identify similar elements. The drawings may be for illustrative purpose to assist understanding and may not be drawn per actual scale. Different aspects of the various embodiments of the invention will become apparent from the following specification, drawings and claims in which:

DETAILED DESCRIPTIONS OF SOME EMBODIMENTS

Figure 1A:
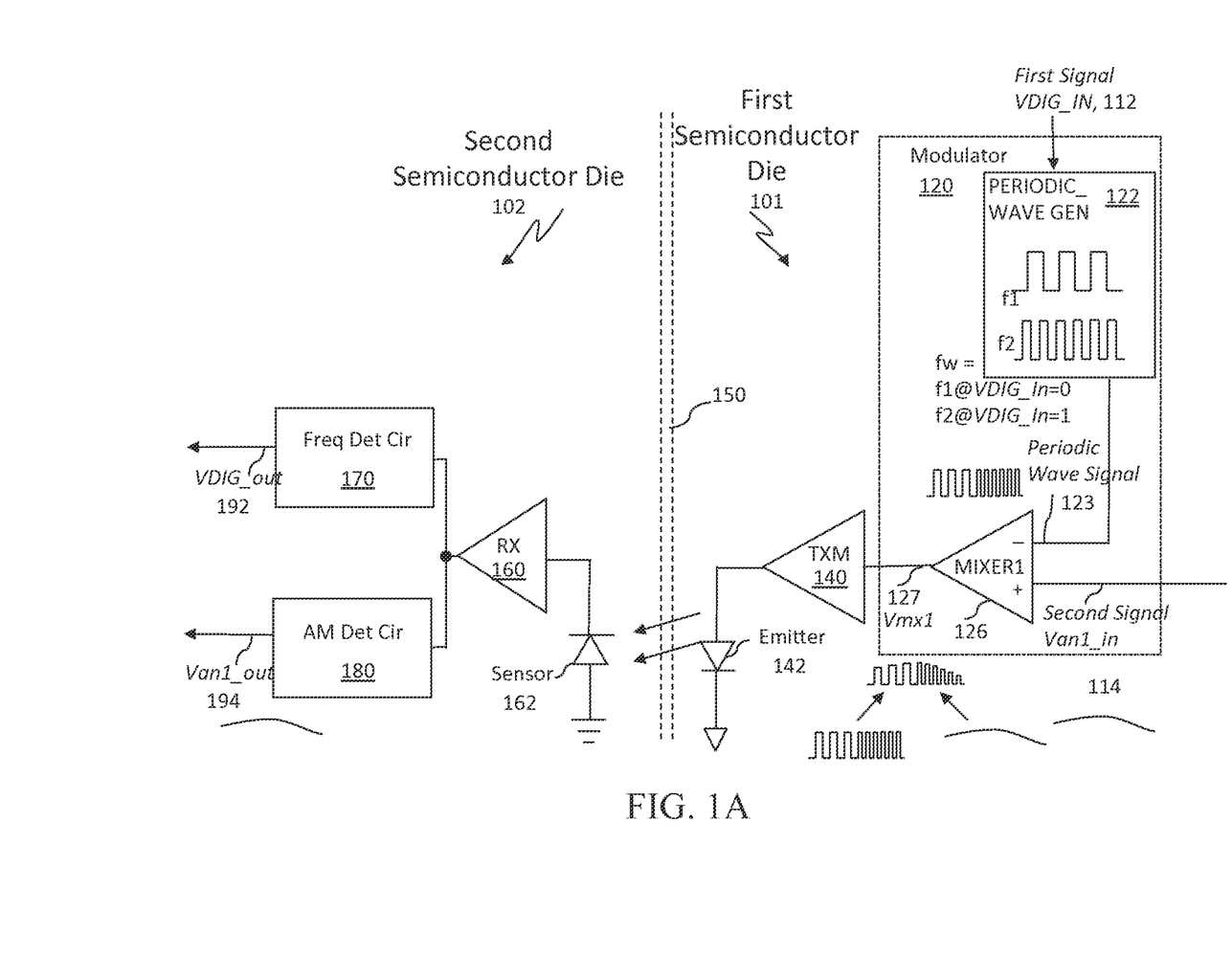
FIG. 1A shows a block diagram of an embodiment of an isolation device configured to transmit at least two signals in a single device.

FIG. 1A shows an illustrative block diagram of an isolation device 100 configured to transmit at least two signals in a single device. In the embodiment shown in FIG. 1A, the at least two signals comprise a first signal 112 and a second signal 114. The first signal 112 may be a digital signal 112. The second signal 114 may be an analog signal 114. The isolation device 100 may comprise a first semiconductor die 101 and a second semiconductor die 102. The second semiconductor die 102 may be located adjacent to but electrically isolated from the first semiconductor die 101. For example, the first semiconductor die 101 and the second semiconductor die 102 may be formed within a lead frame package (not shown) or any other type of packaging used to house or contain the first and second semiconductor dies 101, 102. The first semiconductor die 101 and the second semiconductor die 102 may be spaced apart and separated by an isolation barrier 150 (also referred as an isolation material 150) that electrically isolates the first semiconductor die 101 from the second semiconductor die 102.

The isolation material 150 may be an insulation material such as epoxy, silicone, ceramic or any other electrical insulation materials. In one embodiment, the isolation material 150 may comprise high voltage insulation material such as a kapton tape. The first semiconductor die 101 and the second semiconductor die 102 may be arranged facing each other in the lead frame package such that a surface of the first semiconductor die 101 is positioned approximating and opposing a surface of the second semiconductor die 102. Alternatively, the first semiconductor die 101 and the second semiconductor die 102 may be formed on a common substrate such as a printed circuit board. In another embodiment, the first semiconductor die 101 and the second semiconductor die 102 may be formed on one or two lead frames (not shown) that may be arranged in close proximity within a package but separated by a high voltage insulating material.

The first semiconductor die 101 of the isolation device 100 may include the modulator 120 and the transmitter circuit 140 for transmitting the first signal 112 and the second signal 114 to the second semiconductor die 102. The isolation device 100 may further include an emitter 142 provided within the first semiconductor die 101. Alternatively, the emitter 142 may be provided in a different die adjacent to the first semiconductor die 101. The emitter 142 may be configured to emit a radiation across the isolation barrier 150. The radiation may be detected by a sensor 162 residing within or adjacent to the second semiconductor die 102. The second semiconductor die 102 of the isolation device 100 may comprise substantially a receiver circuit 160, a frequency detection circuit 170 and an amplitude detection circuit 180 for receiving the first signal 112 and the second signal 114 from the first semiconductor die 101.

As shown in FIG. 1A, the modulator 120 and the transmitter circuit 140 may be provided within the first semiconductor die 101 of the isolation device 100. The modulator 120 may be configured to modulate at least a first signal 112 and a second signal 114 into a modulated pulse signal 127. More specifically, the modulator 120 may comprise a periodic wave generator 122 and a mixer 126. Both the periodic wave generator 122 and the mixer 126 may be formed within the first semiconductor die 101. The periodic wave generator 122 may be configured to generate a periodic wave signal 123 having a frequency in accordance with the first signal 112. In the embodiment shown in FIG. 1A, the first signal 112 may be a digital signal. Accordingly, the periodic wave generator 122 may generate the periodic wave signal 123 in a first frequency when the first signal 112 is in a first state and may generate the periodic wave signal in a second frequency when the first signal 112 is in a second state.

Figure 1B:
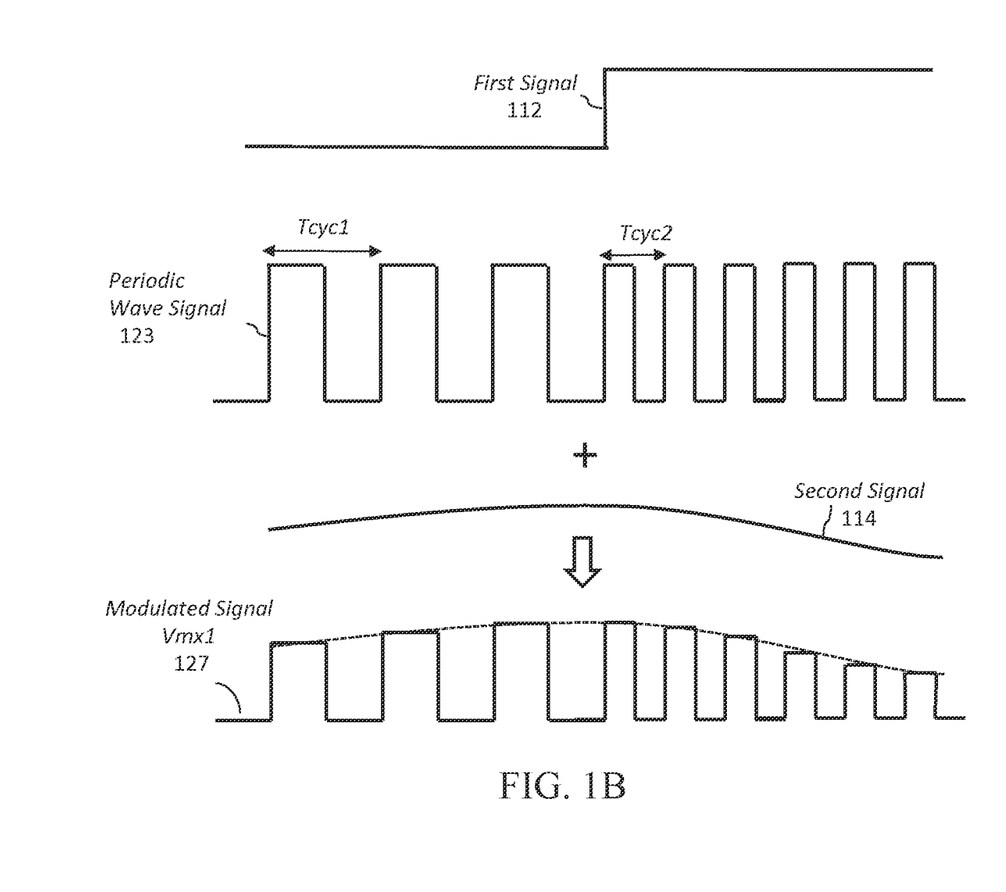
FIG. 1B shows a timing diagram illustrating how the at least two signal is modulated in the isolation device shown in FIG. 1A.

An example of a periodic wave generator's 122 output is shown in FIG. 1B. FIG. 1B shows a timing diagram illustrating how the at least two signal is modulated in the isolation device shown in FIG. 1A. For example, the time period of the periodic wave signal 123 may be Tcyc1 when the first signal 112 is in a digital LOW state. When the first signal 112 is in a digital HIGH state, the period of the periodic wave signal 123 may be Tcyc2 that may be substantially shorter than the time period Tcyc1. In one embodiment, the time period Tcyc1 may be approximately more than three times the time period Tcyc2.

The periodic wave signal 123 may be further modulated subsequently in the mixer 126 in accordance with the second signal 114. The mixer 126 may be a fully differential amplifier in one embodiment. The output of the mixer 126 Vmx1 may also be referred as the modulated pulse signal. As shown in FIG. 1B, the amplitude of the periodic wave signal 123 may be modulated in accordance with the second signal 114. The second signal 114 may be an analog signal. The output Vmx1 of the mixer 126 or the modulated pulse signal 127 may have amplitude that is substantially representative of the second signal 114.

The transmitter circuit 140 may be configured to transmit the modulated pulse signal 127 across the isolation barrier 150 to the second semiconductor die 102. The transmitter circuit 140 may be coupled to the emitter 142 that is configured to transform an electrical signal driven by the transmitter circuit 140 into a radiation signal. The emitter 142 may be light emitting diode provided outside the first semiconductor die 101 or a capacitor plate provided within the first semiconductor die 101. The emitter 142 may be configured to emit a radiation signal that may be a radio-frequency signal, a magnetic field, an electrical field or any other radiation that allow the radiation to be transmitted across the isolation barrier 150 to the second semiconductor die 102 without having a direct electrical contact with the second semiconductor die 102.

The radiation may be detected using a sensor 162 provided within the second semiconductor die 102, or in a separate chip provided adjacent to the second semiconductor die 102. The sensor 162 may be configured to detect the radiation, and transform the radiation therein into an electrical signal. The electrical signal may be then coupled to the receiver circuit 160, which in turn, coupled to the amplitude detection circuit 180 and the frequency detector circuit 170.

As shown in FIG. 1A, the receiver circuit 160, the frequency detector circuit 170, and the amplitude detection circuit 180 may be provided within the second semiconductor die 102. As shown in FIG. 1A, the frequency detector circuit 170 and the amplitude detection circuit 180 may be connected directly to the receiver circuit 160. However, the frequency detector circuit 170 and the amplitude detection circuit 180 may be coupled electrically in parallel arrangement relative to each other.

The frequency detector circuit 170 may be configured to demodulate the modulated pulse signal 127 so as to regenerate the first signal 112. As shown in FIG. 1A, the output 192 of the frequency detector circuit 170 may be substantially similar to the first signal 112. In one embodiment, the waveform of the first signal 112 and the output 192 of the frequency detector circuit 170 may appear substantially identical to each other.

On the other hand, the amplitude detection circuit 180 may be configured to demodulate the modulated pulse signal 127 so as to regenerate the second signal 114. The output 194 of the amplitude detection circuit 180 may be substantially similar to the second signal 114. In one embodiment, the waveform of the second signal 114 and the output 194 of the amplitude detection circuit 180 may appear substantially identical to each other.

Figure 2A:
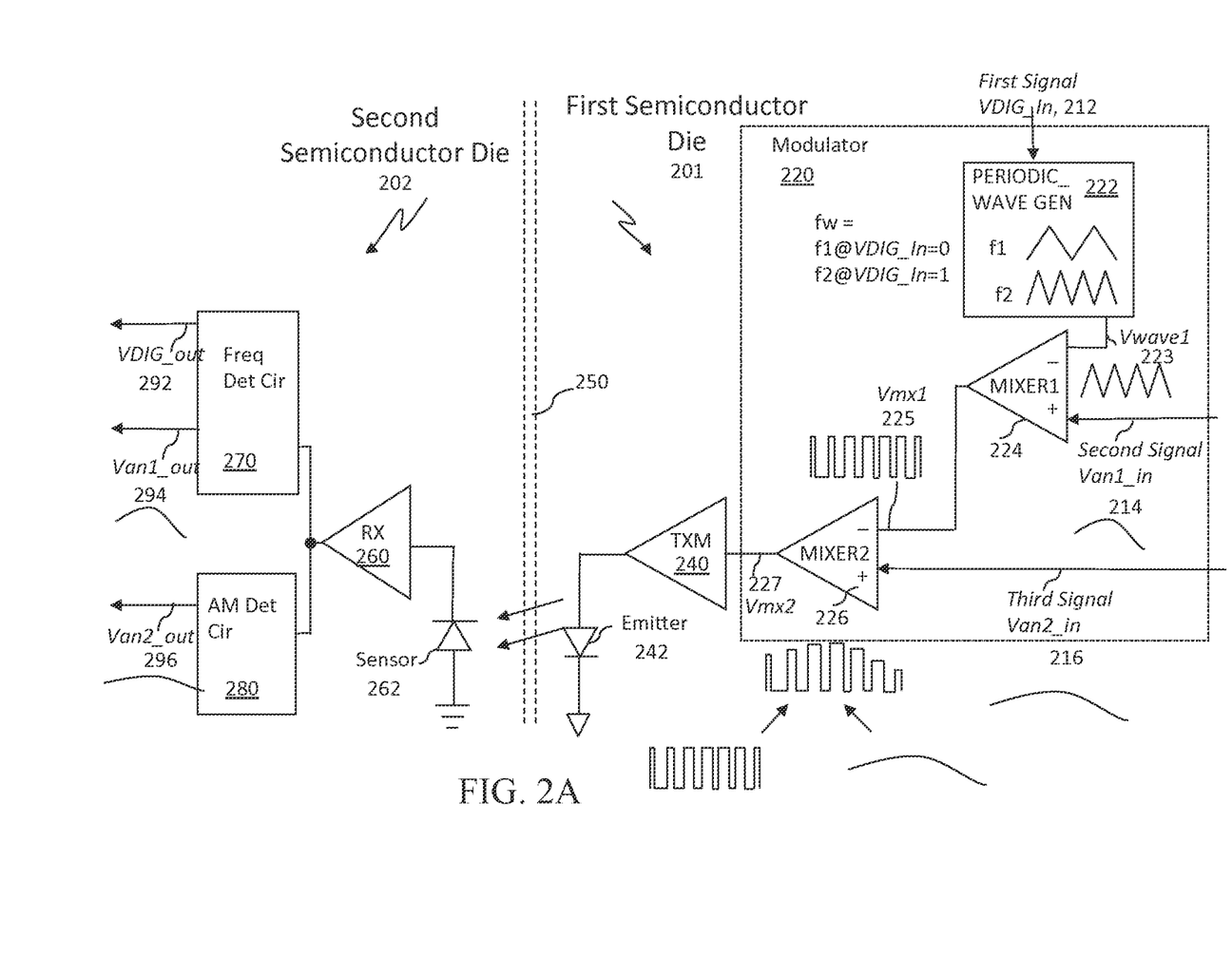
FIG. 2A shows a block diagram of an embodiment of an isolation device configured to transmit at least three signals in a single device.

FIG. 2A shows a block diagram of an embodiment of an isolation device 200 configured to transmit at least three signals in a single device. In the embodiment shown in FIG. 2A, the at least three signals comprise a first signal 212, a second signal 214 and a third signal 216. The first signal 212 may be a digital signal 212. The second signal 214 may be a first analog signal 214. The third signal may be a second analog signal 216. The isolation device 200 may comprise a first semiconductor die 201 and a second semiconductor die 202. The isolation device 200 may further comprise a modulator 220 and a transmitter 240 provided in the first semiconductor die 201. The modulator 220 may comprise a periodic wave generator 222, a first mixer 224 and a second mixer 226. The second semiconductor die 202 may comprise a receiver circuit 260, a frequency detector circuit 270 and an amplitude detection circuit 280. Optionally, the second semiconductor die 202 may comprise a sensor 262. Alternatively the sensor 262 may be provided adjacent to the second semiconductor die 202 and not residing within the second semiconductor die 202.

Figure 2B:
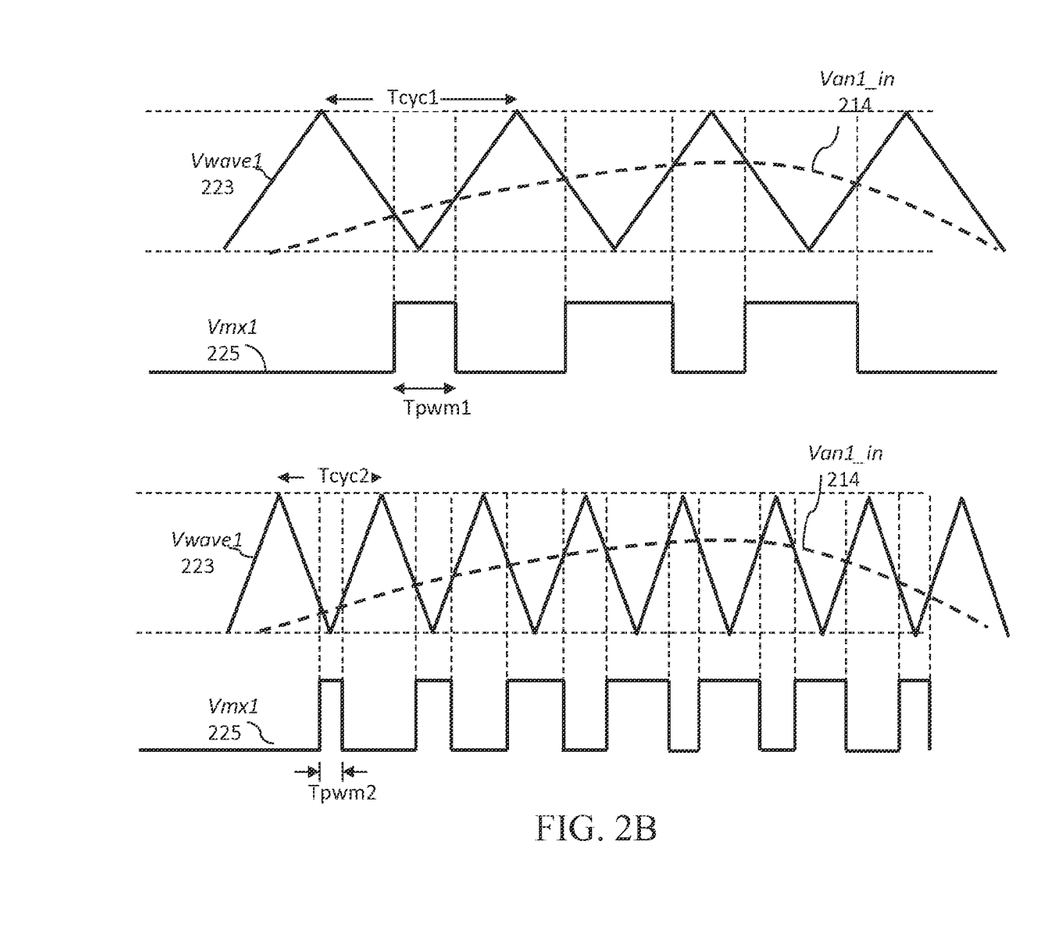
FIG. 2B shows a timing diagram illustrating how a digital signal and an analog signal are modulated in the isolation device shown in FIG. 2A.

The periodic wave generator 222 may be configured to generate a wave signal 223 (also referred as Vwave1) in accordance to the first signal 212. The first signal 212 may be a digital signal represented as VDIG_In as shown in FIG. 2A and FIG. 2B. The first mixer 224 may be configured to modulate the periodic wave signal 223 so as to generate a first modulated signal 225 (also referred as Vmx1) using a pulse width modulation scheme in accordance with the second signal 214. The second signal 214 may be an analog signal represented as Van1_in as shown in FIG. 2A and FIG. 2B.

FIG. 2B shows a timing diagram illustrating how the digital signal 212 and the first analog signal 214 are modulated in the isolation device 200. As shown in FIG. 2B, the periodic wave signal 223 may be a triangular wave signal with a time period of Tcyc1. The first mixer 224 may be configured to generate the first modulated signal 225 using a pulse width modulation. The pulse width of the first modulated signal 225 may be indicative of the second signal 214. The first mixer 224 may comprise a comparator comparing the periodic wave signal 223 and the second signal 214. When the second signal 214 is higher than the periodic wave signal 223, the output of the first mixer 224 may be logic HIGH. In this way, the second signal 214 may be represented by the pulse width or Tpwm1 relative to the time period Tcyc1.

In general, the pulse width modulation of the second signal 214 may not be affected by frequency of the first signal 212. For example, when the first signal 212 is in a different state as shown in the bottom graph of FIG. 2B, the periodic wave signal 223 may be a signal with higher frequency and a shorter time period Tcyc2. Using a comparator provided in the first mixer 224, the signal generated may have a pulse width or Tpwm2 that is substantially shorter than Tpwm1. However, the ratio of Tpwm2 and the Tcyc2 may remain substantially representative of the second signal 214. The output of the first mixer 224 that may be embedded with the first signal 212 and the second signal 214 is also referred as a first modulated signal.

Figure 2C:
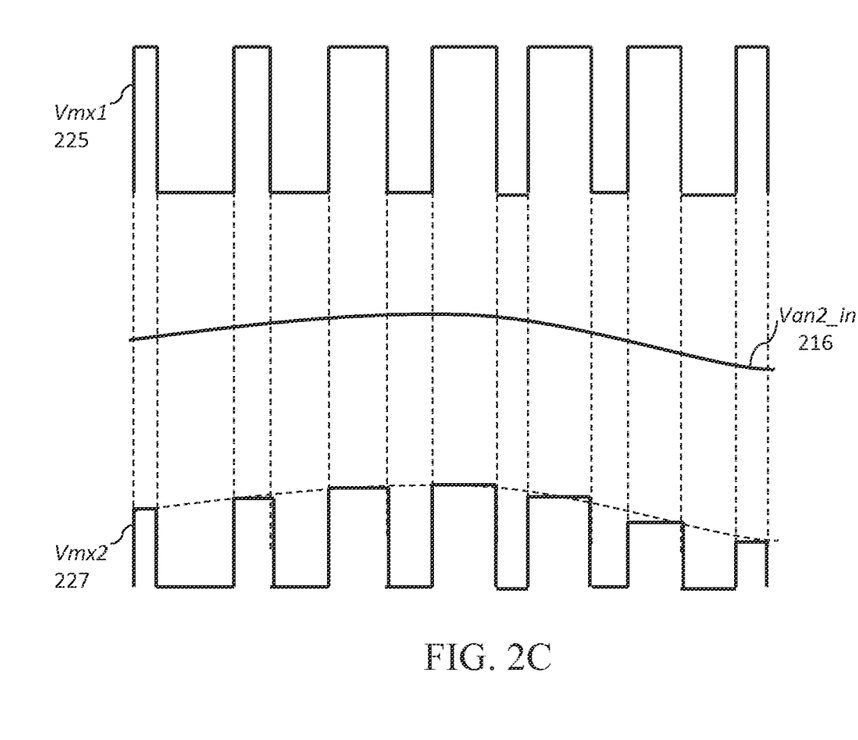
FIG. 2C shows a timing diagram illustrating how an additional analog signal is modulated in the isolation device shown in FIG. 2A.

The second mixer 226 may be mixer circuit such as a Gilbert Mixer or other circuit with fully differential amplifiers. The second mixer 226 is configured to modulate amplitude of the first modulated signal 225 into a second modulated signal 227 in accordance with the third signal 216. The second modulated signal 227 may differ from the first modulated signal 225 at least in that the amplitude of the second modulated signal 227 is not fixed as in the first modulated signal 225. In contrast, the amplitude of the second modulated signal 227 may vary in accordance with the third signal 216 (also referred as Van2_in). The amplitude modulation is illustrated in FIG. 2C that shows a timing diagram illustrating how an additional analog signal is modulated in the isolation device 200.

In the embodiment shown in FIG. 2A, a total of three modulations may have been performed. First, the periodic wave signal 223 may be a modulation in accordance with the first signal 212. The first modulation used in the embodiment shown in FIG. 2A may be a frequency modulation. This is followed by a second modulation done within the first mixer 224. The second modulation used in the embodiment shown in FIG. 2A may be a pulse width modulation, which may be performed on the periodic wave signal 223 that itself may be a form of modulated signal. The third modulation may be the amplitude modulation done using the second mixer 226 to modulate the amplitude of the first modulated signal 225. The sequence of the modulation chosen may have advantages or specific considerations. For example, the frequency modulation and the pulse width modulation may be more tolerant of noise as compared with the amplitude modulation. Therefore, the amplitude modulation is performed right before the transmitter circuit 240 and not earlier. Similarly, in terms of circuit implementation, modulation of a signal into a periodic signal may be more realistic and convenience and therefore, producing the frequency modulated signal in the form of the periodic wave signal 223 may be advantageous in terms of circuit implementation.

The transmitter circuit 240 may be configured to drive an emitter 242. The emitter 242 may be configured to transform the electrical signal from the transmitter circuit 240 into a radiation towards the second semiconductor die 202 such that the second semiconductor die 202 may remain electrically isolated from the first semiconductor die 201. In the second semiconductor die 202, the sensor 262 may be configured to transform the radiation back to an electrical signal that may be detected by the receiver circuit 260.

The frequency detection circuit 270 may be in a parallel arrangement relative to the amplitude detection circuit 280. This arrangement may be beneficial in that the signal detection may be performed concurrently. In addition, the frequency detection circuit 270 and the amplitude detection circuit 280 may be configured to operate independently, and may be configured to have different filtering circuit so as to detect and regenerate the first signal 212, the second signal 214 and the third signal 216 respectively. The frequency detection circuit 270 may be configured to detect the first signal 212 and the second signal 214. The frequency detection circuit 270 may have a counter circuit configured to compute the frequency and the pulse width of the detected signal so as to regenerate the first signal 212 and the second signal 214.

Figure 3:
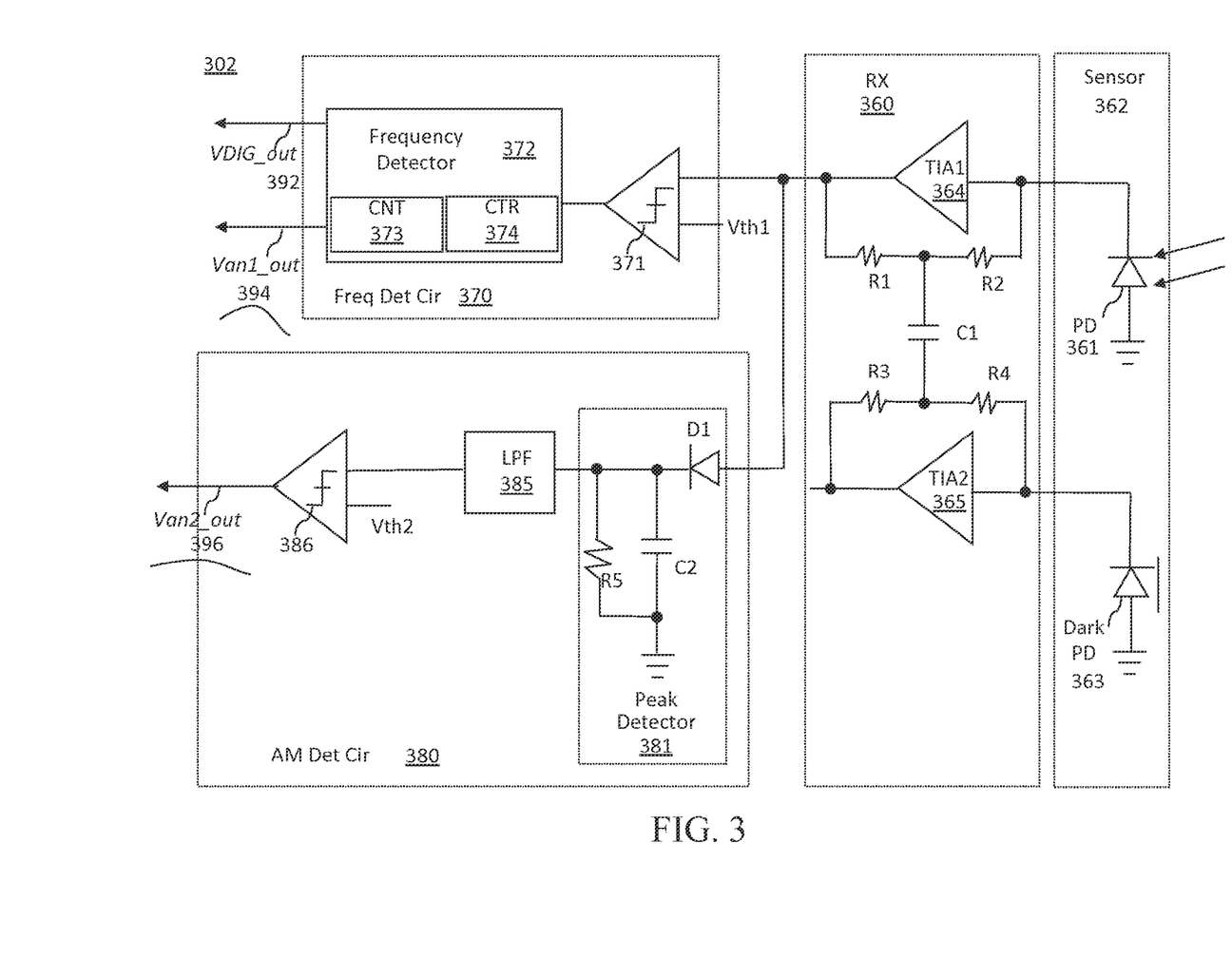
FIG. 3 shows a block diagram of an embodiment of a receiver of an isolation device.

FIG. 3 shows a block diagram of an embodiment of a second semiconductor die 302 of an isolation device (not shown). The second semiconductor die 302 may comprise a sensor 362, a receiver 360, a frequency detector 372 and an amplitude detection circuit 380. The sensor 362 may comprise a first photo diode 361 configured to receive a radiation, and a dark photo diode 363 that is substantially shielded. The dark photo diode 363 may be a photo diode covered by a substantially opaque material such as a metal layer on the semiconductor die 302. The dark photo diode 363 may be arranged substantially similar to the first photo diode 361 such that the noise, for example dark current or other noises, induced by non-radiation sources are substantially similar.

The receiver 360 may comprise a differential amplifier. For example, the receiver shown in FIG. 3 may comprise a first trans-impedance amplifier 364 and a second trans-impedance amplifier 365. The first trans-impedance amplifier 364 and the second trans-impedance amplifier 365 may be coupled in series to the first photo diode 361 and the dark photo diode 363 respectively. The first trans-impedance amplifier 364 and the second trans-impedance amplifier 365 may be arranged such that the effect of dark current and noise may be substantially canceled through the coupling of the capacitor C1. The output of the receiver 360 may be coupled to the frequency detector circuit 370 and the amplitude detection circuit 380 that may be in parallel arrangement.

The frequency detector circuit 370 may comprise a frequency detector 372 and a comparator 371. The comparator 371 may be coupled to the receiver 360 and may be configured to generate a pulse signal as output to the comparator 371. The frequency detector 372 may be coupled in series to the comparator 371. The pulse signal generated by the comparator 371 may be independent from information carried through the amplitude modulation. The pulse signal, also referred as the output by the comparator 371 may be coupled to a frequency detector 372. The frequency detector 372 may comprise a counter 373 and a controller 374. The counter 373 of the frequency detector 372 may be configured to detect the duty cycle and pulse width the pulse signal so as to regenerate the first signal (not shown) and the second signal (not shown) respectively. The regenerated first signal 392 is shown as VDIG_out in FIG. 3, whereas the regenerated second signal 394 is shown as Van1_out in FIG. 3.

The amplitude detection circuit 380 may comprise a peak detector 381, a low pass filter 385 and a comparator 386. The peak detector 381 may comprise a capacitor C2 for accumulating charges in accordance to the modulated pulse signal. In addition, the peak detector 381 may further comprise a diode D1 and a resistor R5 coupled to the capacitor C2 as shown in FIG. 3. The resistor R5 and the capacitor C2 are in a parallel arrangement. This circuit arrangement may ensure that the computation of the amplitude signal is to be performed over a predetermined time period and not spontaneous.

In addition, the amplitude detection circuit 380 may comprise a low pass filter 385 coupled between the peak detector 381 and a comparator 386. The low pass filter 385 may be configured to filter out high frequency signals such as the pulse signal so that only low frequency signals modulated using the amplitude modulation scheme may be detected. The comparator 386 may be configured to regenerate the third signal 396. The regenerated third signal 396 is shown as Van2_out in FIG. 3.

Figure 4A:
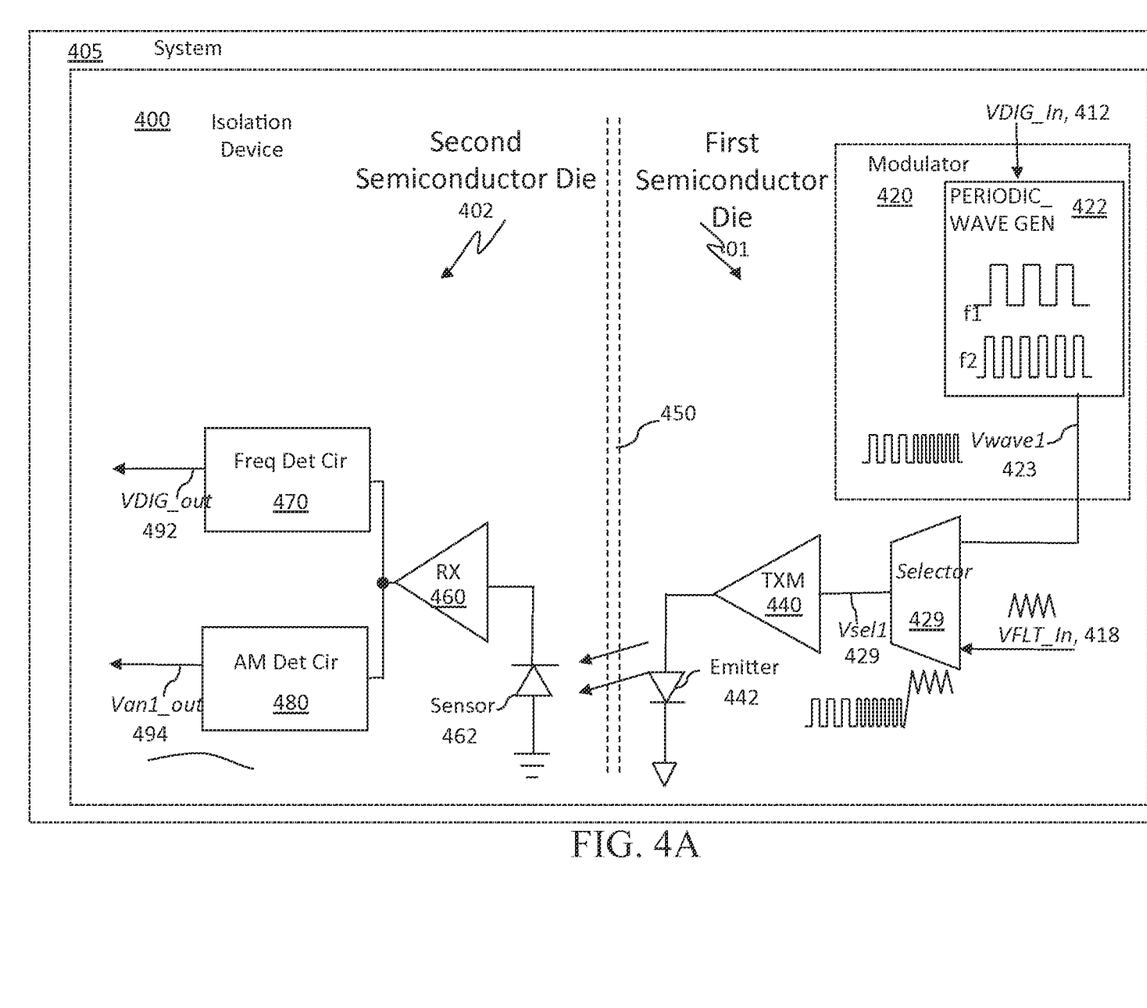
FIG. 4A shows a block diagram of an embodiment of an isolation device configured to transmit at least two signals in a single device in different timing.

FIG. 4A shows a block diagram of an embodiment of an isolation device 400 configured to transmit at least two signals in a single device sequentially. The isolation device 400 may comprise a modulator 420, a transmitter circuit 440, an isolation barrier 450, an emitter 442, a sensor 462, a receiver 460, a frequency detector circuit 470, and an amplitude detection circuit 480. The modulator 420, the transmitter circuit 440 may be provided within a first semiconductor die 401. The receiver 460, the frequency detector circuit 470, and the amplitude detection circuit 480 may be provided within the second semiconductor die 402. The first semiconductor die 401 may be electrically isolated from the second semiconductor die 401 by the isolation barrier 450. The emitter 442 and the sensor 462 may be provided in standalone dies or alternatively, may be provided within the first semiconductor die 401 and the second semiconductor die 402 respectively.

The modulator 420 may comprise a periodic wave generator 422 configured to generate a periodic wave signal having a frequency in accordance with the digital signal 412. Optionally, the modulator may further comprise a first modulator (not shown) configured to modulate the periodic wave signal in accordance with a first analog signal into a first modulated pulse signal having a pulse width indicative of the first analog signal, and a second modulator (not shown) configured to modulate the first modulated pulse signal into a second modulated pulse signal such that the second modulated pulse signal has an amplitude substantially representative of the second analog signal as illustrated in previous embodiments.

In addition, the isolation device 400 may comprise a selector 429 coupled to the modulator 420 and an additional signal 418, as inputs to the selector 429. The additional signal 418 may be a fault signal, VFLT_In, as illustrated in FIG. 4A. The additional signal 418 may be other signals that may be transmitted only when the digital signal and all other additional signals routed through the modulator 420 are not to be transmitted. More specifically, isolation device 400 may operate in two modes. The two modes may be any operation mode that transmits different signals sequentially or in different timing. In the embodiment shown in FIG. 4A, a first operating mode may be a normal mode whereas a second operating mode may be a fault mode, but in other embodiments, there may be other types of operation modes.

Figure 4B:
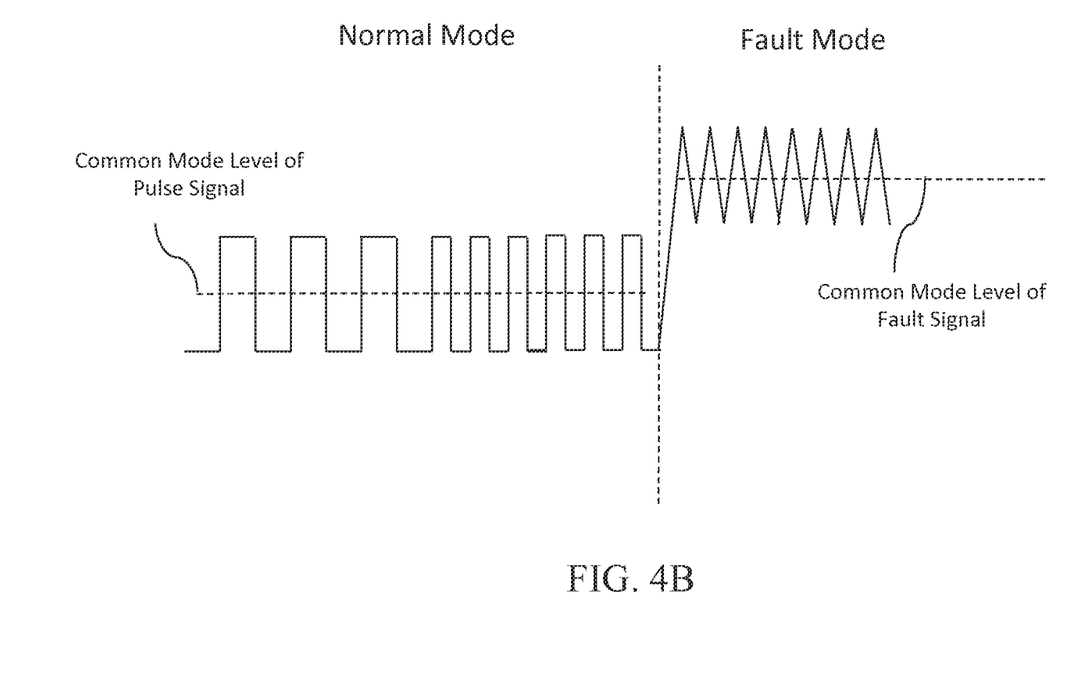
FIG. 4B shows how the isolation device shown in FIG. 4A transmits a signal in a fault mode and in a normal mode.

Referring to the embodiment shown in FIG. 4A, in the normal mode, the output 421 from the modulator 420 such as the wave signal Vwave1 may be coupled to the transmitter circuit 440. In the fault mode, the output 421 from the modulator 420 may be disconnected from the transmitter circuit 440. In the second mode, the additional signal 418 may be coupled to the transmitter circuit 440 so as to be transmitted across the isolation barrier 450. This is illustrated in FIG. 4B. FIG. 4B shows how the isolation device 400 shown in FIG. 4A transmits a signal in the fault mode and in the normal mode. As shown in FIG. 4B, in the normal mode, the pulse form wave signal 423 may be transmitted, but in the fault mode the fault signal 418 also referred as VFLT_In may be transmitted. Optionally, the common mode level of the wave signal 423 and the fault signal 418 may be biased at a substantially different level as shown in FIG. 4B. In addition, the fault signal 418 may have substantially higher frequency relative to the wave signal 412 that operates during the normal mode.

Figure 4C:
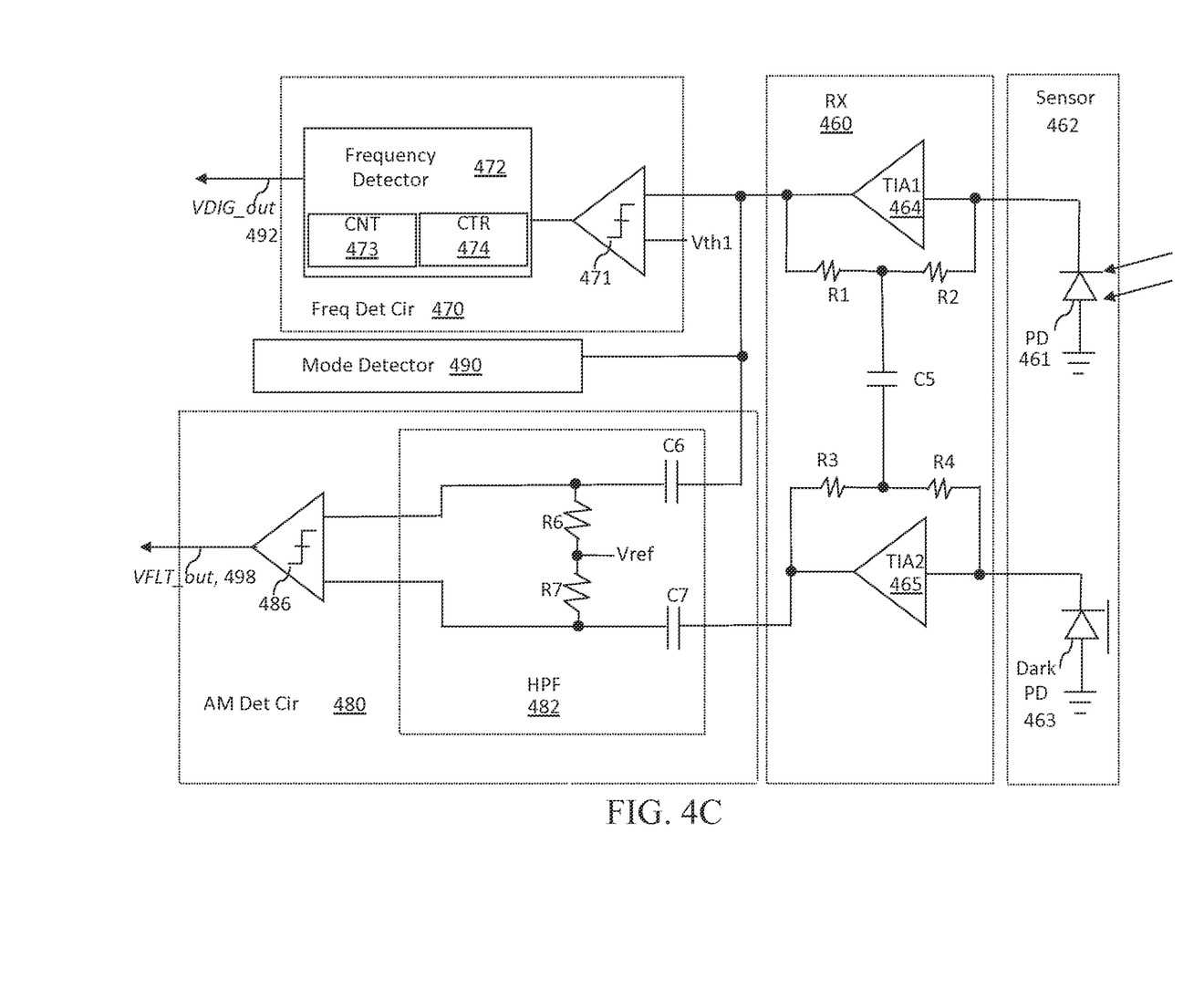
FIG. 4C shows a block diagram of an embodiment of a receiver of the isolation device shown in FIG. 4A.

FIG. 4C shows a block diagram of an embodiment of a receiver of the isolation device shown in FIG. 4A. The sensor 462 of the isolation device 400 may comprise a first photo diode 461 configured to receive a radiation, and a dark photo diode 463 that is substantially shielded. The dark photo diode 463 may be a photo diode covered by a substantially opaque material such as a metal layer. The first photo diode 461 and the dark photo diode may be configured to generate a differential signal in the subsequent block, i.e. the receiver 460.

The receiver 460 may comprise a differential amplifier. For example, the receiver shown in FIG. 4C may comprise a first trans-impedance amplifier 464 and a second trans-impedance amplifier 465. The first trans-impedance amplifier 464 and the second trans-impedance amplifier 465 may be coupled in series to the first photo diode 461 and the dark photo diode 463 respectively. The first trans-impedance amplifier 464 and the second trans-impedance amplifier 465 may be arranged such that the effect of dark current and noise may be substantially canceled through the coupling of the capacitor C5. The output of the receiver 460 may be coupled to the frequency detector circuit 470 and the amplitude detection circuit 480 that may be in parallel arrangement.

The frequency detector circuit 470 may comprise a frequency detector 472 and a comparator 471. The comparator 471 may be coupled to the receiver 460 and may be configured to generate a pulse signal as output to the comparator 471. The frequency detector 472 may be coupled in series to the comparator 471. The pulse signal generated by the comparator 471 may have substantially similar amplitude and independent from information carried through the amplitude modulation. The pulse signal, also referred as the output by the comparator 471 may be coupled to a frequency detector 472. The frequency detector 472 may comprise a counter 473 and a controller 474. The counter 473 of the frequency detector 472 may be configured to detect the duty cycle and pulse width the pulse signal so as to regenerate the digital signal 412 and other additional signals (not shown) modulated by the modulator 420 through pulse width modulation. The regenerated digital signal 492 is shown as VDIG_out in FIG. 4C.

In the embodiment shown in FIG. 4C, the amplitude detection circuit 480 may be configured to operate in the fault mode. The amplitude detection circuit 480 may comprise a high pass filter 482 and a comparator 486. The high pass filter 482 may comprise capacitors C6, C7 and resistors R6, R7 configured to filter out signal transmitted in normal mode that may have a lower frequency. The output of the high pass filter 482 may be coupled to a comparator 486. The comparator 486 may be configured to regenerate the fault signal 498. The regenerated fault signal 498 is shown as VFLT_out in FIG. 4C.

In addition, the isolation device 400 may comprise a mode detector 490. The mode detector 490 may comprise a level sense circuit (not shown) configured to detect the common mode level of the signal so as to determine the fault mode and the normal mode. The isolation device 400 may form a portion of a system 405. The system 405 may be a solid-state lighting system, a DC-DC converter system, or an isolation system. In such systems, during normal operation, various signals may be transmitted in the normal mode using various modulation schemes illustrated in previous embodiments. In the fault mode that may requires several recovery steps, the fault mode may take over and fault signals may be transmitted. The system 405 may comprise other types of isolation devices illustrated in previous embodiments such as the isolation devices 100 and 200.

Figure 5A:
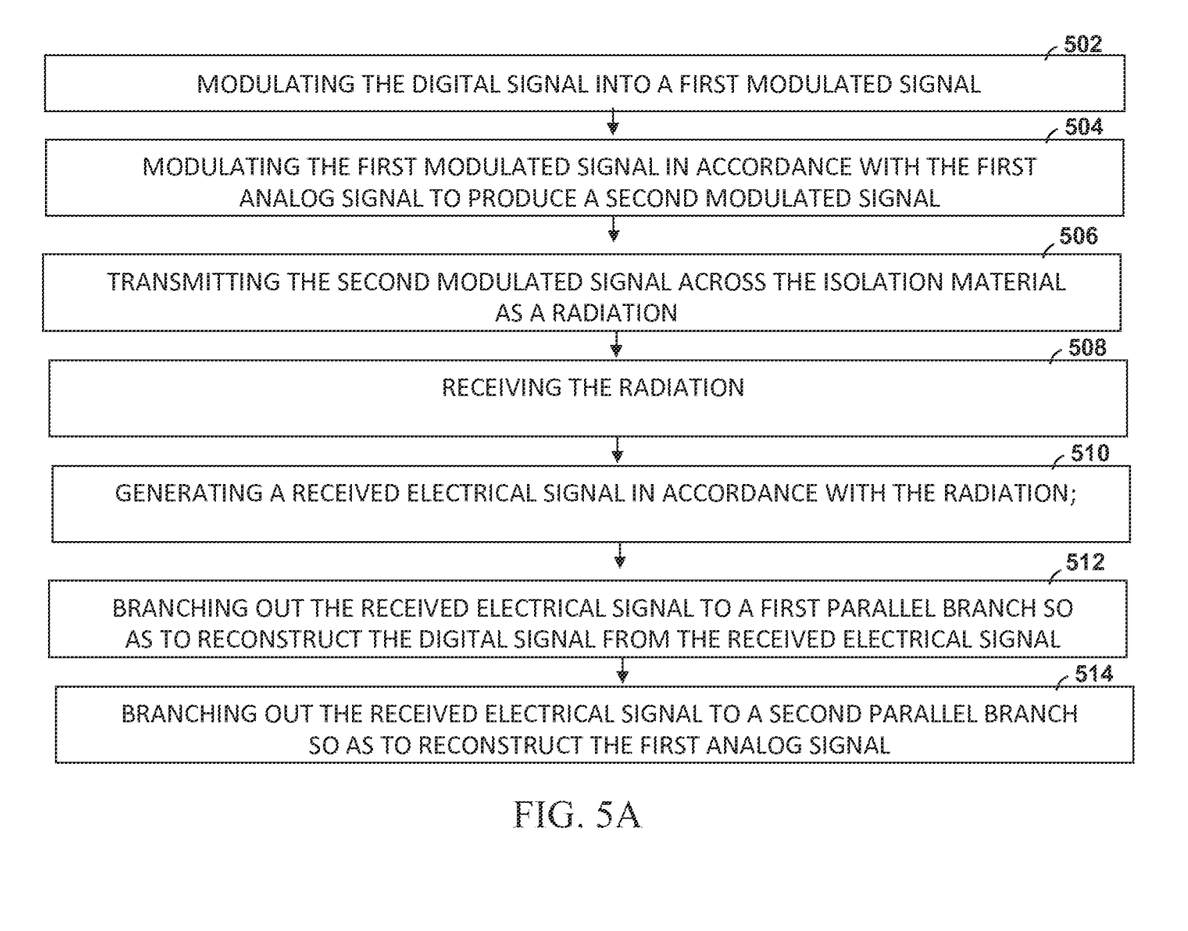
FIG. 5A shows a flow chart illustrating a method for conveying a digital signal and a first analog signal across an isolation material.

FIG. 5A shows a flow chart illustrating a method for conveying a digital signal and a first analog signal across an isolation material. In step 502, the digital signal may be modulated into a first modulated signal. Next, in step 504, the first modulated signal may be modulated in accordance with the first analog signal to produce a second modulated signal. The modulation scheme in step 504 may be an amplitude modulation such that the second modulated signal may have pulse amplitude indicative of the first analog signal. The method then proceeds to step 506, in which the second modulated signal may be transmitted across the isolation material as a radiation. This may be done by using an emitter adaptable to emit light, magnetic field, electric field or any other form of radiation without the need of establishing electrical connection. Steps 502 to 506 may involve transmitting the signal and may be executed using a first semiconductor die having transmitter circuit and modulation circuits. Steps 508 to 514, on the other hand, involves a second semiconductor die having a receiver circuit.

In step 508, the radiation emitted in step 506 may be received using a sensor. The sensor may be configured to generate a received electrical signal in accordance with the radiation in step 510. Next, in step 512, the received electrical signal may be branched out to a first parallel branch so as to reconstruct the digital signal from the received electrical signal. Step 514 may be done concurrently with step 512 may involve branching out the received electrical signal to a second parallel branch so as to reconstruct the first analog signal. In some embodiment, step 514 may be performed after step 512 is executed.

Figure 5B:
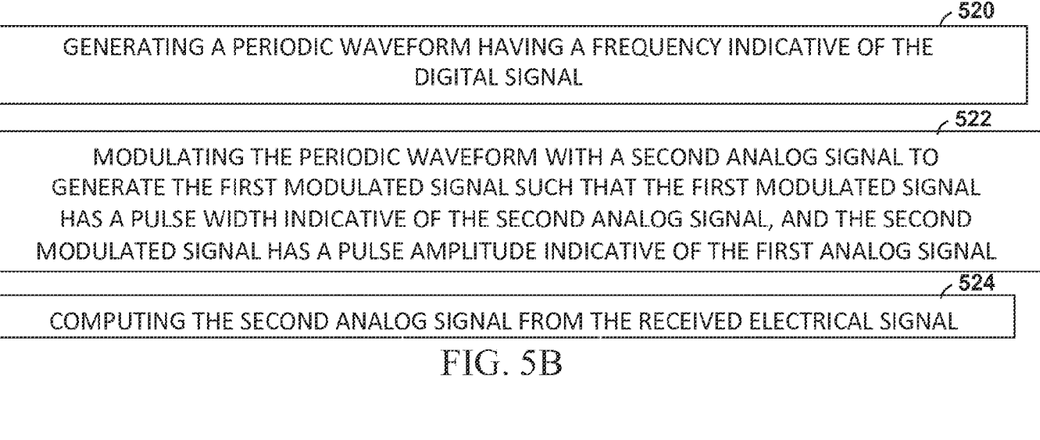
FIG. 5B shows optional steps of the method shown in FIG. 5A.

FIG. 5B shows a first set of optional steps of the method shown in FIG. 5A so as to transmit an additional signal. For example, step 504 may comprise the optional steps 520 and 522. In step 520, a periodic waveform having a frequency indicative of the digital signal may be generated, whereas in step 522, the periodic waveform may be modulated with a second analog signal to generate the first modulated signal such that the first modulated signal has a pulse width indicative of the second analog signal. In response, on the semiconductor side, step 524 may be added concurrently or after step 512 so as to receive the second modulated signal. In step 524, the second analog signal may be computed from the received electrical signal.

Figure 5C:
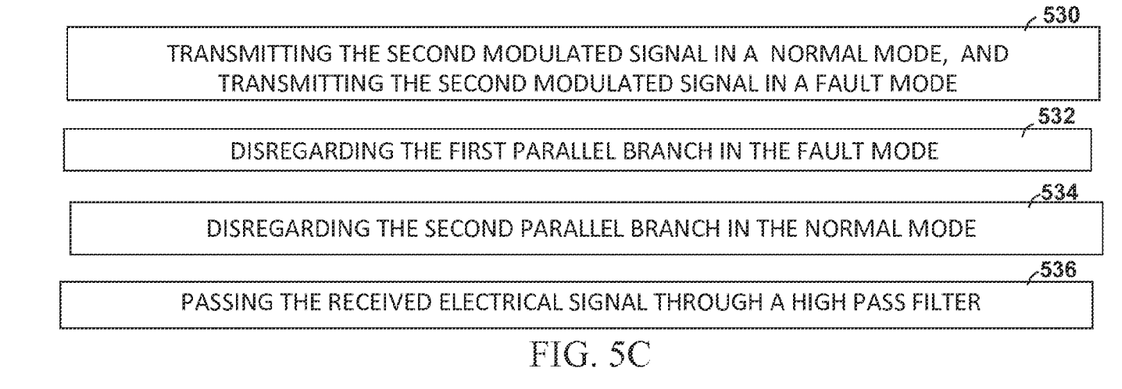
FIG. 5C shows additional optional steps of the method shown in FIG. 5A.

FIG. 5C shows a second set of optional steps of the method shown in FIG. 5A so as to transmit the digital signal and the first analog signal sequentially. For example, step 506 may further comprises step 530 in which the second modulated signal is transmitted in a normal mode, and a fault mode in a sequential manner on the transmitting end involving the first semiconductor die. On the receiving end involving the second semiconductor die, step 510 may be followed by step 532 and step 534. In step 532, the first parallel branch is to be disregarded when the transmission is in the fault mode. In step 534, the second parallel branch is to be disregarded when the transmission is done in the normal mode. In addition, to support the operation in sequential manner using the normal mode and the fault mode, step 514 may further comprise step 536 in which the received electrical signal is passed through a high pass filter.

Different aspects, embodiments or implementations may, but need not, yield one or more of the following advantages. For example, the sequence of modulation scheme to use the amplitude modulation as the final modulation prior to transmitting the signal may improve noise tolerance of the device. In addition, the parallel arrangement of the frequency detection circuits 370, 470 relative to the amplitude detection circuits 380, 480 may be advantageous for enabling noise cancellation, filtering without affecting other modulation scheme.

Although specific embodiments of the invention have been described and illustrated herein above, the invention should not be limited to any specific forms or arrangements of parts so described and illustrated. The scope of the invention is to be defined by the claims appended hereto and their equivalents.

We claim:

1. An isolation device, comprising:
a first semiconductor die;
a periodic wave generator formed within the first semiconductor die, the periodic wave generator configured to generate a periodic wave signal having a frequency in accordance with a digital signal;
a mixer configured to modulate the periodic wave signal in accordance with an analog signal into a modulated pulse signal such that the modulated pulse signal has an amplitude substantially representative of the analog signal;
a second semiconductor die located adjacent to but electrically isolated from the first semiconductor die;
a transmitter circuit formed within the first semiconductor die, the transmitter circuit configured to transmit the modulated pulse signal to the second semiconductor die;
a receiver circuit formed within the second semiconductor die, the receiver circuit configured to receive the modulated pulse signal from the first semiconductor die;
a frequency detector circuit formed within the second semiconductor die, the frequency detector circuit being coupled to the receiver circuit and configured to demodulate the modulated pulse signal so as to regenerate the digital signal; and
an amplitude detection circuit formed within the second semiconductor die, the amplitude detection circuit configured to demodulate the modulated pulse signal so as to regenerate the analog signal.

2. The isolation device of claim 1, wherein the frequency detector circuit and the amplitude detection circuit are electrically coupled in parallel arrangement.

3. The isolation device of claim 1, wherein the frequency detector circuit and the amplitude detection circuit are connected directly to the receiver circuit.

4. The isolation device of claim 1, wherein the mixer comprises a comparator.

5. The isolation device of claim 1, wherein the frequency detector circuit comprises a comparator.

6. The isolation device of claim 5, further comprising a frequency detector coupled in series to the comparator.

7. The isolation device of claim 1, wherein the amplitude detection circuit comprises a peak detector.

8. The isolation device of claim 7, wherein the peak detector comprises a capacitor for accumulating charges in accordance to the modulated pulse signal.

9. The isolation device of claim 7, wherein the peak detector comprises a diode, a resistor and a capacitor, and wherein the resistor and the capacitor are in a parallel arrangement.

10. The isolation device of claim 7, further comprising a low pass filter coupled to the peak detector.

11. The isolation device of claim 1, wherein the first semiconductor die and second semiconductor die form a portion of a solid-state lighting system.

12. A method for conveying a digital signal and a first analog signal across an isolation material from a first system to a second system, the method comprising:
    modulating the digital signal into a first modulated signal, wherein modulating the digital signal into the first modulated signal comprises:
        (i) generating a periodic waveform having a frequency indicative of the digital signal; and
        (ii) modulating the periodic waveform with a second analog signal to generate the first modulated signal such that the first modulated signal has a pulse width indicative of the second analog signal;
    modulating the first modulated signal in accordance with the first analog signal to produce a second modulated signal;
    transmitting the second modulated signal across the isolation material as a radiation;
    receiving the radiation;
    generating a received electrical signal in accordance with the radiation;
    branching out the received electrical signal to a first parallel branch so as to reconstruct the digital signal from the received electrical signal; and
    branching out the received electrical signal to a second parallel branch so as to reconstruct the first analog signal.

13. The method of 12, wherein the second modulated signal has a pulse amplitude indicative of the first analog signal.

14. The method of claim 12, wherein the branching out the received electrical signal to the first parallel branch further comprising computing the second analog signal from the received electrical signal.

15. The method of claim 12, wherein transmitting the second modulated signal comprises transmitting the second modulated signal in one of a normal mode and a fault mode.

16. The method of claim 15, further comprising disregarding the first parallel branch in the fault mode.

17. The method of claim 15, further comprising disregarding the second parallel branch in the normal mode.

18. The method of claim 15, wherein the branching out the received electrical signal to the second parallel branch comprises passing the received electrical signal through a high pass filter.

19. An isolator system adapted to convey a digital signal, a first analog signal and a second analog signal from a first semiconductor die to a second semiconductor die isolated from the first semiconductor die, the isolator system comprising:
    a periodic wave generator formed within the first semiconductor die, the periodic wave generator configured to generate a periodic wave signal having a frequency in accordance with the digital signal;
    a first modulator configured to modulate the periodic wave signal in accordance with the first analog signal into a first modulated pulse signal having a pulse width indicative of the first analog signal;
    a second modulator configured to modulate the first modulated pulse signal into a second modulated pulse signal such that the second modulated pulse signal has an amplitude substantially representative of the second analog signal;
    a transmitter circuit formed within the first semiconductor die, the transmitter circuit configured to transmit the second modulated pulse signal to the second semiconductor die;
    a receiver formed within the second semiconductor die, wherein the receiver is configured to generate a received modulated signal in accordance with the second modulated pulse signal received by the receiver;
    a frequency detector circuit formed within the second semiconductor die, the frequency detector circuit being coupled to the receiver and configured to demodulate the received modulated signal so as to regenerate the digital signal and the first analog signal; and
    an amplitude detection circuit formed within the second semiconductor die, the amplitude detection circuit being configured to demodulate the received modulated signal so as to regenerate the second analog signal.

20. The isolator system of claim 19, wherein the amplitude detection circuit comprises a peak detector and wherein the peak detector is coupled to a low pass filter.

* * * * *